United States Patent
Murphy et al.

(10) Patent No.: US 12,539,460 B2
(45) Date of Patent: Feb. 3, 2026

(54) METHODS AND SYSTEMS FOR PROVIDING HAPTIC FEEDBACK

(71) Applicant: Sony Interactive Entertainment Inc., Tokyo (JP)

(72) Inventors: Alan Murphy, London (GB); Danjeli Schembri, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 326 days.

(21) Appl. No.: 18/166,000

(22) Filed: Feb. 8, 2023

(65) Prior Publication Data

US 2023/0249064 A1 Aug. 10, 2023

(30) Foreign Application Priority Data

Feb. 10, 2022 (GB) .................................. 2201739

(51) Int. Cl.
*A63F 13/285* (2014.01)
*A63F 13/235* (2014.01)
*G06F 3/01* (2006.01)

(52) U.S. Cl.
CPC .......... *A63F 13/285* (2014.09); *A63F 13/235* (2014.09); *G06F 3/016* (2013.01)

(58) Field of Classification Search
None
See application file for complete search history.

(56) References Cited

U.S. PATENT DOCUMENTS

| | | | |
|---|---|---|---|
| 2013/0207792 A1* | 8/2013 | Lim ........................ | G06F 3/011 340/407.1 |
| 2013/0227410 A1* | 8/2013 | Sridhara .......... | H04N 21/43615 715/702 |
| 2014/0176415 A1* | 6/2014 | Buuck ..................... | G06F 3/016 345/156 |
| 2015/0070154 A1* | 3/2015 | Levesque ................ | G06F 3/165 340/407.1 |
| 2015/0268722 A1* | 9/2015 | Wang .................... | A63F 13/843 345/156 |

(Continued)

FOREIGN PATENT DOCUMENTS

EP 2846230 A1 3/2015

OTHER PUBLICATIONS

Extended European Search Report for corresponding GB Application No. 23155602.8, 12 pages, dated Apr. 25, 2023.

(Continued)

*Primary Examiner* — Damon J Pierce
(74) *Attorney, Agent, or Firm* — Fish & Richardson P.C.

(57) ABSTRACT

According to the present invention there is provided an apparatus for providing haptic feedback to accompany media content delivered by a media device, the apparatus comprising: a detection module, configured to determine a haptic capability associated with the apparatus; a receiving module, configured to receive, from the media device, media data associated with the media content; a haptics generation module, configured to generate a haptic signal based on the determined haptics capability and the received media data; and a transfer interface for transferring haptic feedback generated by an associated haptics actuator to one or more peripherals connected to the media device.

19 Claims, 5 Drawing Sheets

(56) References Cited

U.S. PATENT DOCUMENTS

2021/0150865 A1   5/2021   Prasanna

OTHER PUBLICATIONS

Anonymous: "Rumble Pak—Wikipedia" URL:https://en.wikipedia.org/w/index.php?title=Rubmble_Pak&oldid=1067312403, 5 pages, dated Jan. 22, 2022.
Anonymous: "iControlPad-Wikipedia" URL:https://en.wikipedia.org/w/index.php?title=IControlPad&oldid=1032077630, 7 pages, dated Jul. 5, 2021.
Combined Search and Examination Report for corresponding GB Application No. 2201739.6, 14 pages, dated Oct. 17, 2022.
Anonymous, "What Is Cloud Gaming, and Is It Really the Future?" URL: http://www.howtogeek.com/160851/htg-exQlains-what-is-cloudgaming-and-is-it-the-future/ section "Theoretical advantages of cloud gaming" 8 pages, Sep. 22, 2016.

\* cited by examiner

METHODS AND SYSTEMS FOR PROVIDING HAPTIC FEEDBACK

BACKGROUND OF THE INVENTION

Field of the Invention

The present invention relates to methods and systems for providing haptic feedback, and in particular methods and systems for providing haptic feedback for video game environments.

Description of the Prior Art

Media content in recent years is becoming increasingly multi-sensory. In addition to the traditional visual graphics displayed on a monitor and audio elements output from speakers, haptic feedback can be employed to provide a tactile sense of 'touch' with movies, music and games.

Actuators arranged in physical communication with the user can be configured to provide rumble, vibration, or other tactile physical feedback to the user, which can be combined with audio-visual media content to deliver an enhanced immersive multimedia experience. Such 'haptic' feedback is increasingly utilised particularly in video games not only to provide improved immersion but as an additional form of communicating in-game events and ambience to the user.

Recent advancements in haptic technologies have enabled the provision of more complex haptic feedback to the user, with actuators driven by finely tuned signals designed to output a wide range of tactile sensations. Media content in recent years has therefore increasingly incorporated advanced haptics signals designed to be output through high fidelity actuators.

As content platforms become more synergistic, with the emergence of metaverse-type concepts, media content is often enjoyed by the user across a wide range of devices. However, not all such devices have the complex haptic motors and/or actuators required to implement the haptic signals encoded in modern media content, and some media playback devices may lack altogether the capability to provide any tactile feedback to the user. In addition, for media content that has not been originally encoded with haptic feedback data it is difficult to provide the sense of touch for such content.

The present invention seeks to mitigate at least some of the above problems.

SUMMARY OF THE INVENTION

According to an aspect of the disclosure, there is provided an apparatus for providing haptic feedback to accompany media content delivered by a media device, the apparatus comprising: a detection module, configured to determine a haptic capability associated with the apparatus; a receiving module, configured to receive, from the media device, media data associated with the media content; and a haptics generation module, configured to generate a haptic signal based on the determined haptics capability and the received media data.

The apparatus can receive data relating to media content that is being delivered or output on another device (e.g., a movie on output on a TV, or a video game on a computer device), process the data concurrent to the media delivery on the other device to generate a signal in dependence on a haptic capability of the apparatus and output haptic feedback to accompany the media content in real-time. In this way, haptic feedback can be generated and output for media content that is being enjoyed on any platform. By having a detection module configured to determine a haptic capability of the apparatus itself, it is possible to tailor the generation of the haptic signal to the specific situation and capabilities of the apparatus.

Whilst the apparatus may be configured to generate and send the generated haptic signal to one or more associated actuators for output, the apparatus itself may comprise one or more haptics actuators, and the one or more haptics actuators may be configured to output haptic feedback based on the generated haptic signal. In such a case the detection module may be configured to determine a haptic capability of the one or more haptics actuators on the apparatus. By providing an apparatus with ability to generate and output haptic feedback based on both received media input and a determined haptics capability of the on-board haptics actuators, it is possible to deliver peripheral sensory feedback to accompany media content suited to the user's needs. For example the apparatus may be positioned away from the media device, and can be positioned in certain locations so as to transfer the generated haptic feedback, as described herein.

The apparatus may comprise a plurality of haptics actuators. At least one of the plurality of the haptics actuators may be configured to output different haptic feedback to one or more other of the plurality of the haptics actuators based on the generated haptic signal, and optionally each haptic actuator may be configured to output different haptic feedback based on the generated haptic signal. The haptics actuators may be built in to the apparatus or connected such that it is accessible by all other components of the apparatus. In determining the haptic capability of the apparatus, the detection module may be configured to determine the number of haptic actuators present in the apparatus, and/or the number of haptic actuators connected to or accessible by the apparatus. Each of the plurality of haptics actuators may have different fidelities, and the detection module may be configured also to detect the fidelity of each actuator.

The haptics generation module may be configured to generate a haptic signal with multiple channels. In a similar manner to audio channels, each channel may be configured for implementation on separate haptic actuators. For example, where the apparatus comprises a plurality of actuators, each of the channels may be configured to drive separate haptics actuators on the apparatus. One or more of the channels may be configured to be sent from the apparatus to one or more additional devices having haptic capability.

The media data may comprise an original haptic signal associated with the media content. In such a case, the haptics generation module may be configured to modify the haptic received haptic signal according to the determined haptics capability associated with the apparatus. For example, when it is detected that the apparatus possesses the specific capability required to reproduce the received original haptics signal to a required fidelity, the haptics generation module may simply pass the original haptic signal as the output. If the detection module determines that the haptic capability of the apparatus does not match the required fidelity to output the original signal, or includes additional such capabilities, the haptics generation module may modify (e.g., by modulation or by filtering) the original signal and output a modified version of the original signal as the generated signal. Such modification may be performed by reference to other information contained in the media data. The original haptic signal may be contained in a header of media content data, or may be integrated or associated with the content metadata.

The media data may comprise one or more audio signals. The haptics generation module may be configured to generate a haptic signal based on at least one of the one or more audio signals. Audio intensity in media content typically correlates with the variation of action or interesting moments in the media content playback. By generating the haptics signal based on one or more audio signals of the media content it is possible to match the variation of action or interesting moments with the tactile sensations to the user. Haptic sensations generated at one or more actuators generally comprise vibrations, similar to vibrations at speakers for audio signals. Audio signals can therefore provide a good starting point for generating haptic signals.

The received audio signals may be used by the haptics generation module in a number of different ways to generate the haptics signal. The haptics generation module may be configured to perform a low-pass filter on at least one of the one or more audio signals. The haptics generation module may be configured to determine low frequency effects of at least one of the one or more audio signals.

Haptics generation may also be based on other sources. For example, the media data may comprise graphical information for example the output visual data from the media device. The haptics generation module may be configured to interpret the visual scene depicted by the media device and to generate haptic signals based at least in part on the visual scene. In other examples the media data may comprise an approximation or low-resolution version of the scene rendered on the media device. Haptics may also be generated in response to specific events which may be detected and recognised as being of high importance, or events which have been pre-determined as correlating to haptics generation (for example an explosion or a flash of lightning can be detected both visually and semantically, and events such as a character levelling up or performing a certain action may be detected purely semantically). Other events that may also be characterised and transmitted by the media data include button and/or key presses by the user, voice chats, notifications, and incoming/outgoing messages.

As mentioned herein, some or all of the haptics signal generated by the haptics generation module may be configured to be sent to further external devices. The apparatus may further comprise a communication module, configured to communicate with one or more external devices having external haptics capabilities. The communication module may be configured to send at least part of the generated haptic signal to the one or more external devices. In this way the apparatus can act as a central hub, which first receives media data from the media device, interprets the data and generates a haptic feedback signal based on the received data and distributes the haptic feedback among multiple peripheral devices to provide immersive and, potentially remote, sensory feedback to accompany the media content. Where multiple additional external devices are connected, the detection module may be configured to detect the haptics capability of the external devices. The haptics generation module may then generate one or more haptics signals based additionally on the detected external haptics capability of the external devices. That is, the haptics signal may be generated based on the capability of all haptics actuators to which the apparatus may have access (e.g., both on-board the apparatus itself and also any additional devices connected to the apparatus through the communication module). The apparatus may comprise means for detecting its position and/or orientation. For example the detection module may be configured to detect the position and/or orientation of the apparatus. Such information may be detected with reference to another device such as the media device. The haptics generation module may be configured to generate the haptic signal in additional dependence on the detected position and/or orientation information. For this the detection module may be configured to operate suitable means such as a GPS positioning unit or accelerometer. In examples where multiple devices are paired or connected to the apparatus, the apparatus may comprise means for detecting the position and/or orientation information of each of the connected devices. Alternatively (or in combination), some or each of the connected devices may comprise their own means for detecting their respective positions and/or orientations.

The media data may be transmitted from the media device to the apparatus by one or more various means. For example, the media device and apparatus may be by wired connection The apparatus may comprise a wireless receiver to receive signal transmitted wirelessly by the media device. The wireless receiver may be part of the receiving module or the communications module, and may also be configured for transmission of wireless signals. Where reference is made to a wired connection herein, such a connection can comprise a USB type A, B or C interface, and/or any other suitable form of wired data transfer. Where reference is made is wireless connections this can be established for example via Bluetooth connection, NFC, or through a network such as a Wireless Local Area Network propagated by WiFi® signals. Where multiple apparatuses and devices are connected, it will be appreciated that a mixture of wired and wireless connections may be used. Generating and outputting haptic feedback vibrations can in some instances be energy intensive. In some examples, the apparatus may be configured to receive power for recharging an on-board power source such as a battery. Such power may be received via wired transmission or via wireless means such as inductive or capacitive charging. In some examples the communication of information (such as media data and/or haptics signals generated by one apparatus and sent to another) can be transmitted through the power transmission itself—e.g., by modulating the power signal or a carrier thereof—between devices.

The media content may be video game content and the media device may be a computer entertainment device. Computer entertainment device may be a PC, video game console, handheld device such as smartphone or portable console.

The apparatus may be a smartphone. The detection module, receiving module and haptics generation module may be operable by an application software installed on the smartphone. Where the apparatus comprises a communication module, the module may also be operable by the application software.

The apparatus may also be configured to receive user input comprising preferences for haptics generation and/or output. For example the receiving module may be configured to receive user input. In the case of the apparatus being a smartphone the user input may be made through a suitable interface for example an application displayed on a touchscreen operable by the user. The haptics generation module may be configured to generate the haptics signal in additional dependence on the received user input. For example the user may specify, through the user input, preferences for the strength (e.g., amplitude of signal) of the haptics output, or specify a timing such as a delay between when the signal is normally supposed to be output (i.e., concurrent with the media playback on the media device) and when the signal is actually output through the devices. The user may also specify the exact location of the apparatus—e.g., located in a chest pocket or trouser pocket, on the desk or in contact with a peripheral such as a keyboard. Where multiple devices are connected to the apparatus, the user may specify the position and/or orientation of each of those devices. The user may also specify which of the connected devices are to be used (e.g., the user can 'turn off' some of the devices for certain outputs) when outputting the generated haptics signals.

Where a system of multiple devices is established (e.g., an apparatus according to the first aspect connected to multiple external devices), each of the devices may be identical in constitution and configuration to the apparatus according to the first aspect. In some examples, such a system may comprise a single apparatus according to the first aspect and one or more additional devices having the same constitution but without the capability for generating its own haptics signal. In other words the system may comprise one apparatus configured to receive media data, detect haptics capabilities associated with it (e.g., the haptics capability of the connected system), generate the signal and distribute to the other additional devices which only have the necessary components to receive the generated haptics signal and to output the received signal through one or more on-board (or otherwise) haptics actuators. In some examples the system may comprise a mixture of such devices and apparatuses.

The apparatus may further comprise a transfer interface for transferring, by contact, haptic feedback generated by the haptics actuator to one or more peripheral devices. One or more of the peripheral devices may be connected to the media device and may also be an input device to the media device. As the apparatus provides a possibility for generating and delivering sensory haptic output to accompany media content on the media device, that haptic output may be delivered to the user in a number of different ways. For example, in the case that the apparatus is a smartphone, the user may place the smartphone in his or her pocket, while playing a video game on a computer. Media data—relating to the video game being played on the computer—may be sent to the smartphone remotely, say, and the smartphone can generate and output the haptic feedback in dependence on the detected haptics capabilities of the phone and the media data from the computer. In other examples, the apparatus may be positioned in other locations so as to provide a desired effect. For example, where a user is playing a video game on a computer, the user may connect peripherals such as keyboard and mouse as input devices to the computer. Most input devices such as USB keyboards are not equipped with haptic actuators. The apparatus may be configured to allow physical connection to a peripheral such as a keyboard, to allow the sensory output (e.g., vibration) from haptic actuators to be transferred to the keyboard, thereby bestowing haptic feedback functionality to the peripheral device. The interface may comprise a means for securing the apparatus to one or more of a peripheral and a user. For example the interface may comprise a clip or elasticated means to allow the apparatus to be secured in physical connection to a peripheral device such that haptics and vibrations generated by the apparatus are transferred to the peripheral device. Other means of connection may include for example hook and loop fasteners, snap button, and textured surfaces. The interface may also be configured to secure a connection to the user. The interface may also comprise a region of increased physical conduction of vibrations, compared to the rest of the apparatus (or surface of apparatus). For example a region may include a loose component to amplify the vibrations generated by any associated haptic actuators.

The media data may for example comprise information about input from a peripheral device (acting as input device to the media device). In the case of a keyboard peripheral, when the user presses a keystroke input to the media device, the media device may send a signal as part of the media data to indicate that keystroke, and the apparatus may generate and output a haptic signal in response to (and indicative of) the keystroke. In some examples, the apparatus may comprise a communication module which is further configured to communicate with such peripheral devices such that peripheral information (such as information indicative of keystrokes as noted above) can be directly transferred to the apparatus. The haptics generation module may then generate the haptic signal based at least in part on the peripheral information. The media data may comprise position or location information about certain events, such as in-game events. The media data may comprise information which can be used by the haptics generation module to determine which haptics actuators, devices or apparatus is to output certain signals. For example, if a player in a video game environment is confronted with physical 'hits', the media data may comprise information about the location of those hits—e.g., a hit to the chest, followed by a hit to the leg. If one apparatus according to the invention is positioned in a user's chest pocket and another apparatus positioned in the user's trouser pocket (such positioning being detectable by the apparatuses themselves or explicitly specified by the user through user input), the haptic signals may be generated such that corresponding haptic feedback at the chest is output when the hit is made to the chest and the feedback to the leg is output when the hit is made to the leg.

According to another aspect of the present disclosure, there is also provided a method of providing haptic feedback to accompany media content delivered by a media device, the method comprising: receiving, from the media device, media data relating to the media content; determining a haptic capability, generating a haptic signal based on the determined haptic capability and the received media data, and the generated haptic feedback signal.

According to another aspect of the present disclosure, there is also provided a method of providing haptic feedback to accompany media content delivered by a media device, the method comprising: sending, from the media device, media data to a second device; determining, at the second device, a haptic capability associated with the second device; generating, at the second device, a haptic signal based on the determined haptic capability and the received media data, and outputting haptic feedback at the second device according to the generated haptic signal.

According to another aspect of the present disclosure, there is also provided a system for providing haptic feedback with media content, the system comprising: a first device, configured to process and output media content; a second device, configured to receive media data from the first device and to generate a haptic signal based on the received media data and a determined haptic capability of the second device, wherein the second device is configured to output the generated haptic signal concurrent with the first device outputting the media content.

In some examples, the second device of the system may be an apparatus according to the first aspect disclosed above, with any one or more of the features described herein in connection with that aspect. That is, a system may comprise a first device configured to process and output media content and a second device in accordance with the first aspect disclosed above.

It will be appreciated that any one or combination of the features described with respect to each aspect of the disclosure may be adapted and/or applied to another of the aspects described herein, with their associated effects and advantages.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
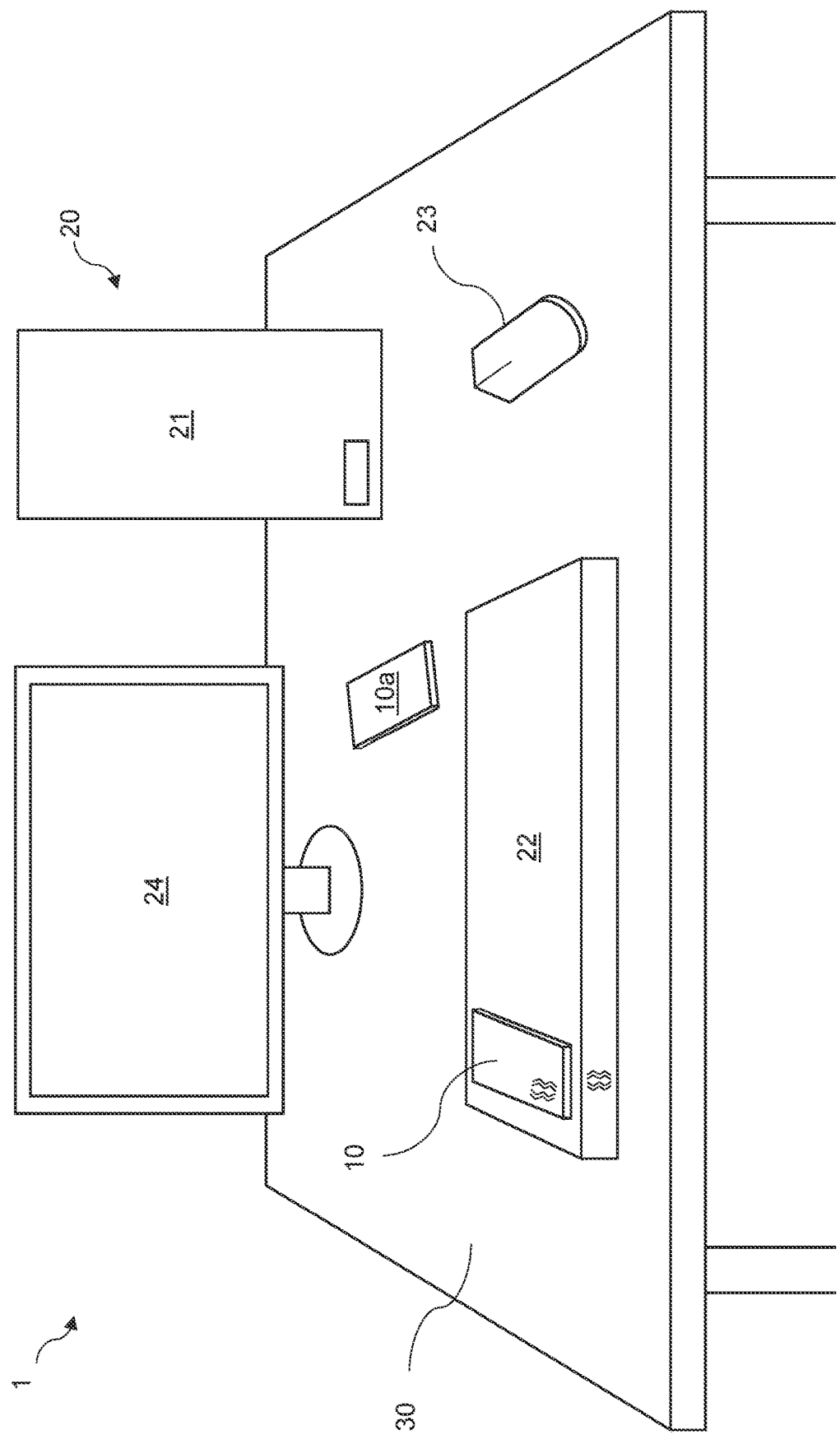
FIG. 1 schematically illustrates an example desktop environment in which an example apparatus and/or method may be implemented.

An aspect of the present disclosure is an apparatus for providing haptic feedback to accompany media content delivered on another device. An exemplary environment in which such an apparatus may be implemented is illustrated in FIG. 1.

The desktop environment 1 comprises an example apparatus 10 and a gaming system 20, both located directly or indirectly on or near a table 30.

The gaming system 20 in this example is illustrated as comprising a desktop computer connected to peripherals. In particular, the gaming system 20 comprises a desktop tower 21 connected—via wired or wireless connection not shown—to input devices 22, 23 and display monitor 24.

The desktop tower 21 comprises components and configurations required for loading and running a video game environment, such as a central processing unit, CPU, graphics processing unit, GPU, memory and storage. In any case, the tower 21 comprises the means necessary to generate and/or deliver media content (e.g., movies, video games and other interactive or multimedia experiences); the details of the inner components and workings will not be discussed in detail. In some examples the game environment can be processed and loaded off the tower 21 and streamed through a network, for example.

The tower 21 is connected to input means 22, 23. The input means 22, 23 allow a user to operate the gaming system 20 so as to control aspects of the media content loaded by the tower 21 such as a game environment. Examples of such input means comprise a keyboard 22 and a mouse 23. The tower 21 is also connected to a display monitor 24 for outputting graphics generated by the gaming system. Other peripherals may also be connected such as speakers, headphones and/or microphones. Unlike traditional gaming controllers, input means 22, 23 typically do not comprise means for providing vibration or haptic feedback. In other words, keyboard 22 and mouse 23 typically do not comprise haptic actuators.

The desktop environment 1 also comprises an example apparatus 10. The apparatus 10 in this example is illustrated as a smartphone device. In other examples (some of which are discussed below) the apparatus 10 takes different forms other than a smartphone. The apparatus 10 in this example comprises a communication module, a processor and a plurality of haptics actuators. The processor is associated with a detection module, a receiving module and a haptics generation module as described herein. In some examples each of these modules is contained and integrated within the processor. In other examples the modules are separate to and controlled by the processor. The communication module is configured and operable to allow, via wired or wireless connection, the transmission and reception of information between the apparatus 10 and the gaming system 20 (which may have a similar communication module in the desktop tower 21 for example). The haptics actuators are generally configured to receive a signal and output vibration through rotating motors, for example, in accordance with the signal.

In use, the gaming system 20 loads a game environment which is delivered to the user through peripherals such as monitor 24, and which is operable by the user through input devices 22, 23. The user can enjoy the media content—in this case the video game—through the gaming system 20. Whilst the gaming system 20 is generally configured to enable operation of a video game environment, and the following examples are illustrated in the context of such video games, it will be appreciated that such a system can also deliver other multimedia content to which the techniques disclosed herein can also be applied. For example the desktop tower 21 can also be configured to deliver movies and music, which can also be accompanied by haptic feedback.

As mentioned, the system 20 is also connected to the apparatus 10. The system 20 sends, in real-time, media data relating to the video game in operation to the apparatus 10. The apparatus 10 receives the media data and checks the haptics capability associated with the apparatus 10. Then, the apparatus 10 analyses the received media data and determined haptics capability to generate a haptics signal in dependence on the received media data and determined haptics capability. The generated haptics signal is then transmitted to the haptics actuators to which the apparatus 10 has access. Such steps can be fully controlled by the processor on-board the apparatus 10; that is, the process may be computer-implemented. In the example environment 1 shown in FIG. 1, this means that the user will experience haptic feedback relating to the game—which is viewed through the monitor 24 and controlled through inputs 22, 23—through the smartphone 10. The smartphone 10 can be positioned in any location suitable to the user to transfer physical vibrations to the user—such as in the pocket of the user, on the table 30 (where the vibrations from the apparatus 10 will transfer to the table 30 and to the user), or in contact with one of the input peripherals 22, 23 as shown in FIG. 1.

In some cases the apparatus 10 can be configured to provide tactile haptic feedback in immediate response to input through peripheral input devices 22, 23. For example, when a user presses a particular key on the keyboard 22, the apparatus 10 can output a feedback to confirm that key press. This can be achieved by having the processors on-board the desktop 21 configured to detect a key press and send a signal indicating the key press (through the media data, say) to the apparatus 10, which will in response generate and output a haptic feedback indicative of that key press. When the apparatus 10 is arranged in the manner shown in FIG. 1, with the apparatus in contact with the keyboard 22, it can generate the sensation that the vibration originated at the key which the user presses. In some examples, the input devices 22, 23 may comprise their own means of communicating directly with the apparatus 10. In some cases, the desktop 21 need not be involved and the keyboard 22 can for example directly communicate an indication of the key press to the apparatus 10 which then generates and outputs a haptic signal accordingly.

In the example environment 1 there is also provided a second apparatus 10a, similar in constitution and configuration as the apparatus 10—having a processor, communication module and one or more haptic actuators. The second apparatus 10a is 'paired' with the apparatus 10 (through, for example, their respective communication modules) such that the haptic actuators of the second apparatus 10a are known and are operable by the apparatus 10. When such additional apparatuses are paired, the apparatus 10 recognises the haptic actuators of such devices as part of the haptic capabilities associated to it. That is, when the apparatus determines its haptics capability, it recognises the haptic actuators on-board the apparatus 10 itself and additionally the further haptic actuators on the second apparatus 10a.

With the second device 10a paired, when the gaming system 20 sends media data, the apparatus 10 now generates a haptic signal suitable for output through the two different devices 10, 10a. In some examples the two devices can be arranged spaced apart and the apparatus 10 can generate a stereo haptic signal. That is to say, the haptic signal can have multiple channels, each channel arranged for output through different haptic actuators. In this way the two devices 10, 10a can provide directional output. In some examples, one or all of the devices 10, 10a can comprise means for detecting position and orientation of each device. The position and orientation information of each such device can be either detected or collected by the apparatus 10 and the haptic signal can be generated taking into account this information. For example if it is known that the apparatus 10 is on the 'left' side of the user and the second apparatus 10a is on the 'right' side of the user, then the apparatus 10 can generate a haptic signal which outputs certain elements to the left side and certain other elements to the right side. Multiple such devices can be paired to provide multi-directional haptic feedback. The orientation of the device can also be used to give an approximation of the position of the device with respect to the user: if the device is vertically oriented the device is likely to be in a pocket of a standing user or on a stand, and if flat down, the device is likely to be laid down on a surface or in the pocket of a user sitting down. This information can also be used to tailor the signal to each device.

Determining the haptics capability of the apparatus 10 can be important for several reasons. Firstly, when the steps of this example method are implemented by an application software ('app') installed on the apparatus 10, such an app can be run on many different kinds of devices, each device having distinct and different components for providing haptic feedback. If a too complex haptic signal is generated and attempted to be output through a coarse rumble motor, the resulting feedback can be confused and could even cause damage to the actuator. It is therefore important that the generated haptic feedback is tailored and optimised for the specific haptic capability of each device. Secondly, the apparatus 10 at which the processing happens may be connected to multiple devices having haptic capabilities, through wired or wireless connections. Such connections may not always be maintained or may be suddenly supplemented by new connections to new additional devices. Therefore, the check for the capability also checks which devices are connected and accordingly all available haptics actuators to which the apparatus currently has access.

Whilst FIG. 1 illustrates the gaming system 20 as a desktop computer, in other examples the system may equally take other forms. For example the gaming system 20 can be a gaming console such as a PlayStation 5.

In some cases the video game loaded and operational on the gaming system 20 can comprise pre-encoded haptics signals. Such signals are often designed for output through one particular device (for example through a console controller). As such the techniques of the present invention can also be applied to modify even pre-encoded haptic signals. The media data disclosed herein can therefore include pre-encoded haptic signals which can be analysed by the apparatus 10 and altered to produce an output suitable for the apparatus 10 and any connected haptic capable devices.

Figure 2:
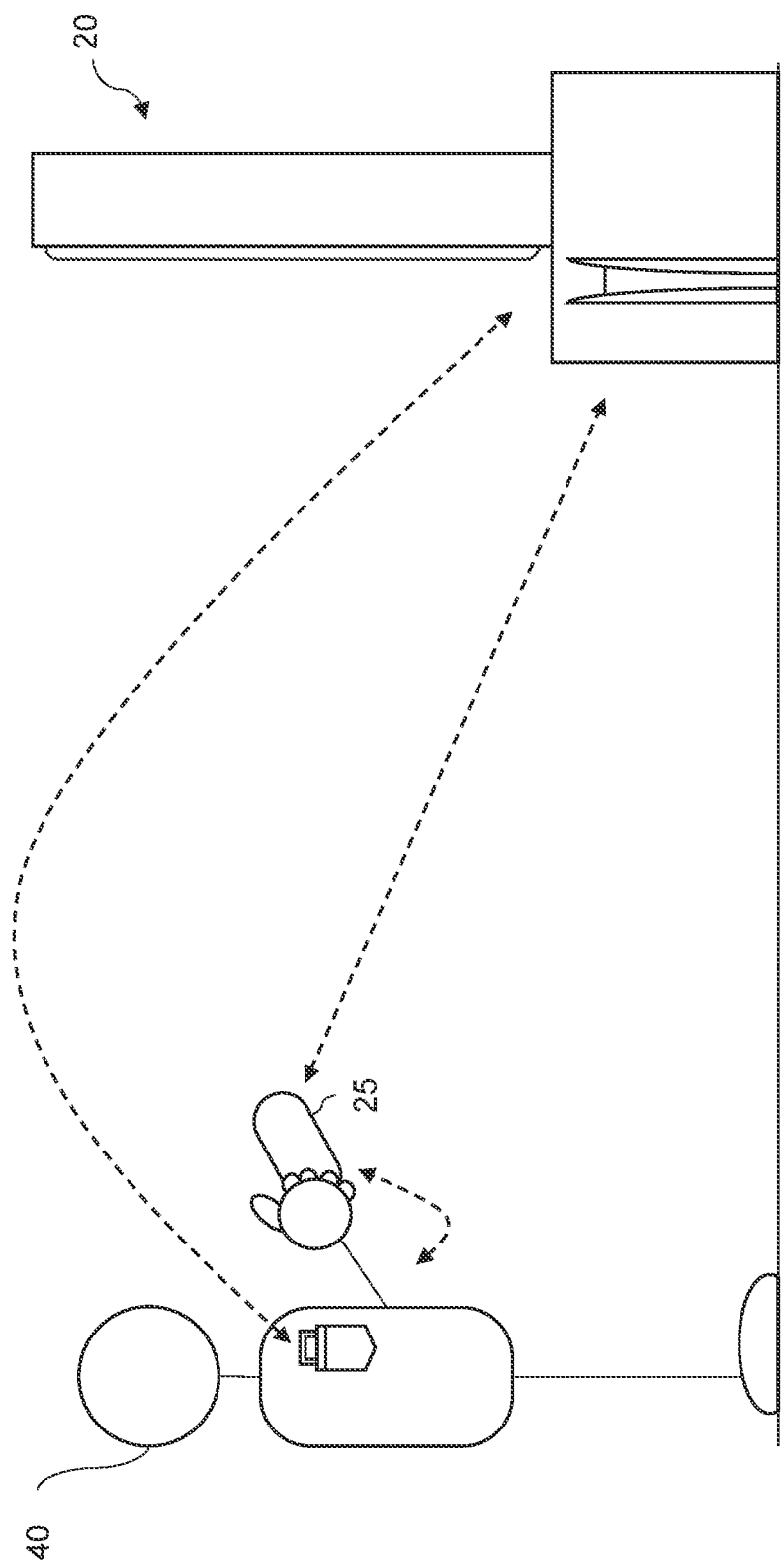
FIG. 2 schematically illustrates an example gaming environment in which an example apparatus and/or method may be implemented.

In FIG. 2, a user 40 is playing a video game run on a gaming system 20, operable through input controller device 25. The user has an apparatus 10—similar to the apparatus 10 of FIG. 1—located in his pocket.

As part of the video game running on the system, the gaming system 20 loads a set of pre-encoded haptics signals, generally designed for output on the input controller device 25. The gaming system 20 sends, in real-time, the pre-encoded haptics signals to the controller device 25 which outputs the appropriate haptic feedback through haptic actuators on the controller 25.

In this example the user has paired the apparatus 10 in his pocket to the gaming system 20 via wireless connection. The apparatus 10 receives media information from the system 20 and checks the haptics capabilities accessible to the apparatus 10. The media information can consist of, or comprise as part of a wider range of information, the pre-encoded haptics signals loaded in the game. The apparatus 10 can then generate a new haptic signal based on the received media information and the determined haptics capabilities available to the apparatus 10, which can be output through the haptic actuators to which the apparatus 10 has access.

In some examples, the connection between the apparatus 10 and game system 20 allows the apparatus 10 an indirect access to the haptic capability of the controller 25. In other examples the apparatus 10 can have a direct connection to the controller 25. In either case the apparatus 10 can receive the media data from the game system 20 and generate a new signal for simultaneous output on both the controller 25 and the haptic actuators onboard the apparatus 10. As with the example shown in FIG. 1 the apparatus 10 may take into account the positioning and orientation of each of the apparatus and controller in generating the haptic signal. In other examples the apparatus 10 is not connected at all to the controller 25 and generates an independent haptic signal for output solely on the apparatus 10 (and other connected devices).

Figure 3:
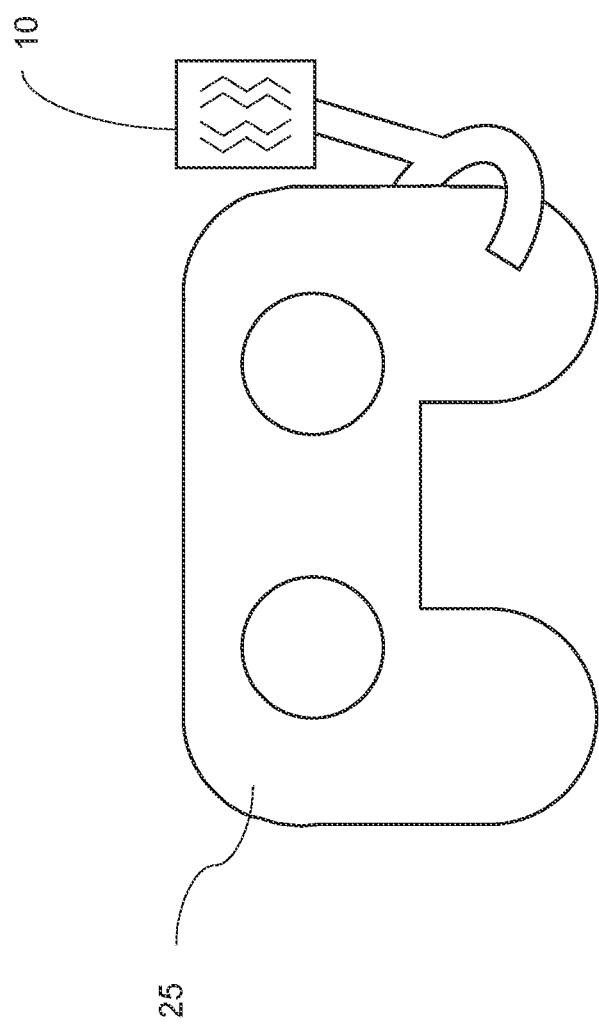
FIG. 3 schematically illustrates an example apparatus in use with an example controller for a video game.

Whilst the apparatus 10 has been illustrated in FIGS. 1 and 2 as resembling a smartphone device, the apparatus can take other forms. FIG. 3 illustrates an apparatus 10 which is designed for being clipped on to an input controller device 25. The apparatus comprises a communication module, one or more haptics actuators and a clip interface for clipping onto various surfaces and peripherals. In this example the apparatus 10 is clipped onto a controller 25. The controller may have haptics capabilities of its own—which can be supplemented or boosted by that of the apparatus 10—or may not have any vibration or haptic actuation abilities. When haptic actuators on the apparatus 10 are activated to output feedback in dependence on a generated haptics signal, the vibrations are conducted through the clip interface by contact to the controller, and through the controller to the user. In some examples the clip interface (or a similar interface for transferring vibrations by contact) can be integrated with an apparatus 10 such as those described in FIGS. 1 and 2. In some examples, the apparatus 10 can be a device which is specifically designed for use with certain peripheral devices. For example, a mouse cover or a mouse mat can be integrated with the components of the apparatus 10 as described herein. Such a mouse cover or mouse mat is generally configured for maintaining contact with a mouse 23 or other input device, and an on-board haptic actuator can generate the haptic feedback vibrations which transfer by contact to the mouse 23 and to the user through contact. Other examples include a keyboard mat (configured for placement under a keyboard 22), keyboard cover (configured for placement over the surface of keys) or replacement key caps for a keyboard 22. For example a replacement key cap integrated with a haptics actuator can generate vibrations for reception by a fingertip of a user. In some examples a combination of such accessories can be utilised to provide a more immersive experience. For example, an apparatus 10 in the form of keycaps (for example the WASD keys) or a keyboard cover or mat can be used in conjunction with a mouse mat or cover: the keyboard side can provide a left-side channel of haptic feedback and the mouse side can provide a right-side channel of haptic feedback (in the case of right-handed users). It will be appreciated that one of the keyboard accessories can act as the apparatus 10 and the other accessories such as the mouse accessories can act as the additional apparatus 10a (or vice versa). It will be similarly appreciated that where the haptic actuators reside within a smart phone, the smart phone may be similarly coupled to a keyboard or other surface, for example using a sleeve that may be adhered to the reverse of the keyboard, or a mouse mat with padding on the reverse comprising a recess to accommodate the phone, or mounted for example on a rear portion of a handheld controller.

Figure 4:
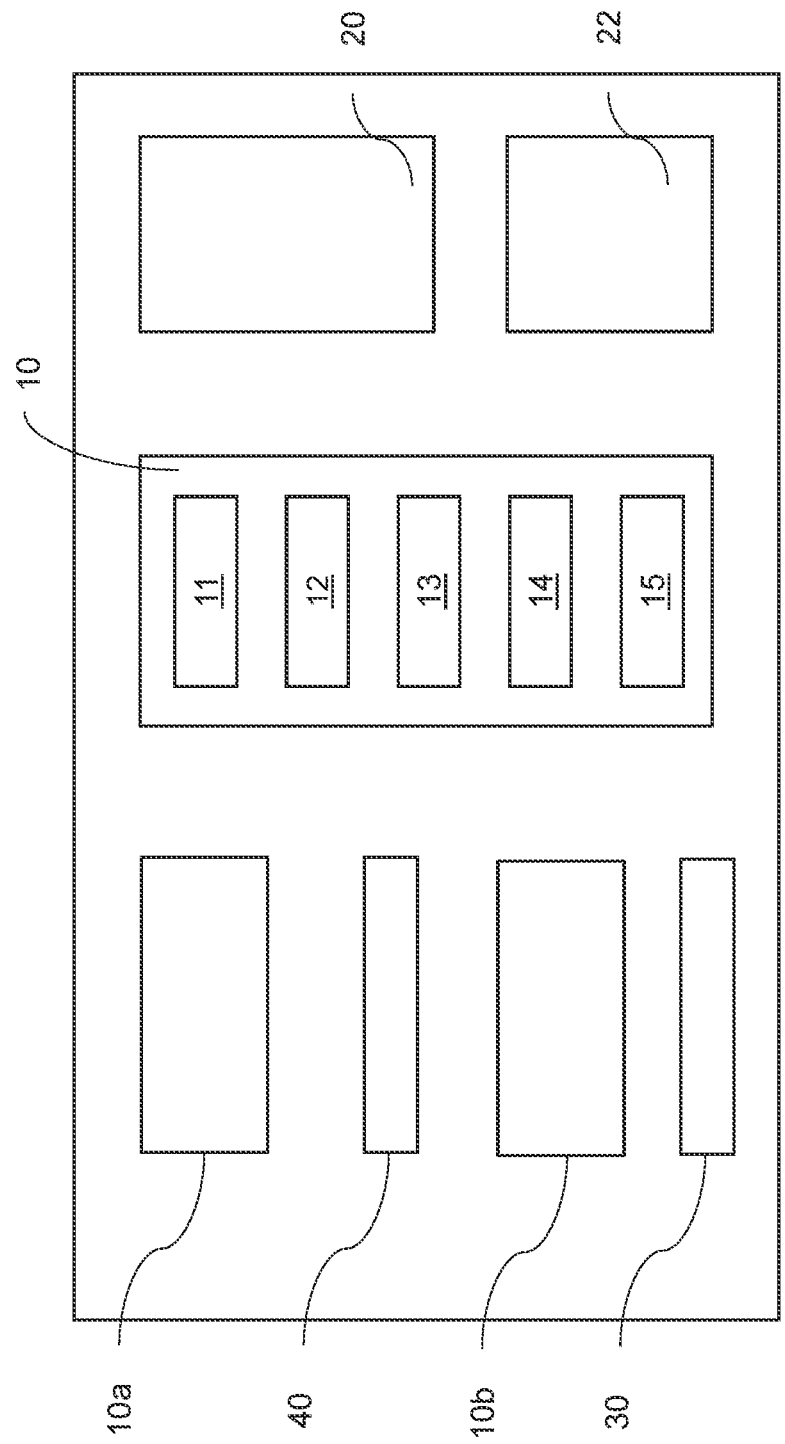
FIG. 4 is a schematic block diagram of a system such as a computer configured to implement an example method.

FIG. 4 is a schematic block diagram of an example system configured to provide haptic feedback alongside media content. In this example the system comprises an apparatus 10 and game system 20, both positioned on or near a surface 30 and arranged for use by a user 40. There are also two additional devices 10a, 10b.

The example gaming system 20 may for example be a desktop computer or video game console and is typically connected to at least one input peripheral device 22 and display and audio means not shown here. Details of the system 20 are similar as described above with respect to FIG. 1.

The apparatus 10 in this example comprises a detection module 11, a receiving module 12 and a haptics generation module 13. The apparatus 10 also optionally includes a haptics actuator 14 and a communications module 15. The apparatus 10 is paired with the game system 20—that is to say that a suitable connection has been established between the apparatus 10 and the game system 20 such that information can be exchanged between the two. The apparatus is also in wireless connection (e.g., via Bluetooth connection) to the additional devices 10a, 10b.

In use, the user 40 operates a video game loaded by the game system 20, via the one or more input peripherals 22. The system 20 sends data about the game as part of media data to the apparatus 10. The receiving module 12 receives the media data from the game system 20. Parallel to the reception of the media data, the detection module 11 detects the haptics capability currently associated with the apparatus 10. This detection can be performed before, simultaneous with or after the reception of the media data at the receiving module 12.

With the haptics capability of the apparatus 10 detected and media data received, both the information is passed to the haptics generation module 13 which generates a haptics signal in dependence on both the detected haptics capability and the received media data. Where the media data is continuously transmitted from the game system 20 to the apparatus in real-time flow, the haptics generation module 13 continuously processes the data to generate the haptics signal. Once generated, the haptic signal is sent to the various haptic actuators to which the apparatus 10 has access, such as the on-board actuator 14 and the additional devices 10a, 10b. Some or all of the generated haptics signal can be sent by the communication module 15 to the additional devices 10a, 10b. In some examples the generated haptics signal can be sent back to the game system 20 for storage or wider broadcast. In such cases the signal can also be saved alongside metadata indicating the specific haptics capabilities detected at the time of generation.

The apparatus 10 can be positioned on the surface 30 or in contact with one or more of the input peripheral devices 22, in order to provide haptic sensations and vibrations to such surfaces and peripherals. Each additional apparatus 10a, 10b can also be positioned at various locations such as in the pocket of the user 40 or on the same surface or device as apparatus 10 but at different locations and orientations so as to provide multi-channel, multi-directional haptic feedback. Each of the apparatus 10 and additional apparatuses 10a, 10b can also comprise position and/or orientation detection means such as an accelerometer, and the haptics generation module 13 can be configured to generate the haptic signal in additional dependence on such position/orientation information.

The apparatus 10 may constitute or comprise a computer configured to implement methods disclosed herein. The computer may comprise a processor, at least one memory and an input/output interface. The processor may execute instructions stored in the memory in order to perform such methods. The input/output interface may be configured to receive media data and output a generated haptic signal.

Figure 5:
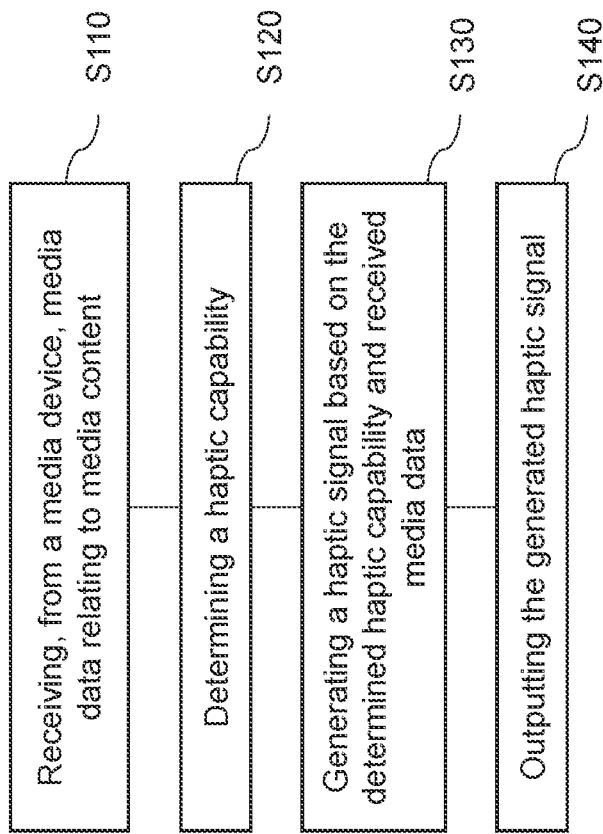
FIG. 5 is a flow chart schematically illustrating steps of an example method as disclosed herein.

FIG. 5 is a flow chart schematically illustrating steps of a general method according to the invention.

At step S110, media data relating to media content delivered by a media device is received. This can be done for example by controlling an input unit to receive the media data.

At step S120, a current haptic capability is determined. When the method is performed in relation to a haptics device, the current haptic capability associated with that haptics device is determined. That is, the haptics capability of all haptics actuators to which the haptics device has access is determined.

At step S130, a haptic signal is generated in dependence upon both the media data received at step S110 and the haptic capability determined at step S120. If a continuous stream of media data is being received, this step can be continuously performed to generate new haptic signals.

At step S140, the generated haptic signal is outputted. By output, the signal itself can be simply output and transferred to devices which have haptic actuators. The signal could also be output on the same device as steps S110 to S130: that is, the signal could be sent to haptic actuators on-board the same device on which the current haptic capability is determined and on which the signal is generated.

Some or all of the steps can be done in different orders, simultaneously with each other, or continuously. For example the step S120 can be done in advance of step S110; that is, the step of detecting the haptics capability associated with a device can be done before the step S110 of receiving media data to that device. In some examples, step S120 can be done continuously, so that the current status of available haptics capabilities can be constantly updated. The updating can be done at regular intervals. Equally, the step S110 can also be done continuously such that media data is sent and received in a continuous stream. The stream can be sent constantly or in packets.

In some examples, the method is carried out across at least two devices. That is, a first device loads and plays back media content. That device sends media data relating to the media content to a second device, which performs step S110 to receive the media data. The second device then performs steps S120 and S130 to detect haptics capability associated with the second device and then generates a haptic signal based on the received media data and the detected haptics capability. The second device then performs step S140 to output the generated haptic signal. This can be achieved by either the second device sending the haptic signal to one or more on-board haptics actuators, or sending the haptic signal to one or more additional devices having haptics actuators, for output (or a combination of the two).

In some examples the method can be applied across a PC and a mobile device such as a smart phone. The PC may load a game or other multimedia content for consumption by a user. Media data relating to the game or other content can be sent, over wireless or wired connection, to the smartphone which receives it in accordance with step S110. The smartphone can then detect the haptic capability associated with it and, based on the detected capability and received media data, generate and output a haptic feedback concurrent with the media content on the PC.

In some examples the method can also comprise an additional step of positioning the haptic device in contact with a user or a peripheral device, such that any haptic feedback output by the haptic device is transferred, by contact, to the user or peripheral device. In the example of the PC and smartphone above, the phone can be positioned in contact with a keyboard connected to the PC, for example, to provide transfer of haptic feedback to the keyboard.

In some examples the method can also comprise an additional step of receiving a user input comprising preferences for haptics generation and/or output. The user input can for example specify particular preferences or settings by which the haptics signal may be generated. In the case that multiple devices are paired or connected, or multiple haptics actuators are available, the user input can also specify which of the devices and/or actuators are to be used (and therefore signals generated for them), and also specify the location, position and/or orientation of those multiple devices and actuators. For cases where such user input is received, the haptics signal can be generated in step S130 in additional dependence on that user input. Where a signal is generated continuously, the user input can be received during a flow of generation and the signal modified accordingly.

Other arrangements as described herein, for example with respect to FIGS. 1 to 4 can also be made by suitably modifying the method of FIG. 5.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus for providing haptic feedback to accompany media content delivered by a media device, the apparatus comprising:
   a detection module, configured to determine a quantity of haptics actuators controllable by the apparatus and a haptic capability of each haptics actuator controllable by the apparatus;
   a receiving module, configured to receive, from the media device, media data associated with the media content;
   a haptics generation module, configured to generate a haptic signal based on (i) the determined quantity of haptics actuators, (ii) the determined haptic capability of each haptics actuator, and (iii) the received media data, wherein the haptic signal has multiple channels, each channel of the multiple channels being configured to drive a different haptics actuator; and
   a transfer interface for transferring, by contact, haptic feedback generated by haptics actuators driven with the haptic signal to one or more peripherals connected to the media device.

2. The apparatus according to claim 1, wherein the media data comprises an original haptic signal associated with the media content, and the haptics generation module is configured to generate the haptic signal by modifying the original haptic signal according to the determined quantity of haptics actuators and the determined haptic capability of each haptics actuator.

3. The apparatus of claim 2, wherein the haptics generation module is configured to generate the haptic signal by:
   determining whether the haptic capability of each haptics actuator is suitable for outputting the original haptic signal; and
   in response to determining that the haptic capability of at least one haptics actuator is not suitable for outputting the original haptic signal, modifying the original haptic signal to generate the haptic signal.

4. The apparatus according to claim 1, wherein the media data comprises one or more audio signals and is not encoded with an original haptic signal, and the haptics generation module is configured to generate the haptic signal based on at least one of the one or more audio signals.

5. The apparatus according to claim 4, wherein the haptics generation module is configured to perform one or more selected from the list consisting of:
   i. a low-pass filter on at least one of the one or more audio signals; and
   ii. a determination of low frequency effects, LFE, of at least one of the one or more audio signals.

6. The apparatus according to claim 1, wherein at least one haptics actuator is integrated with an external device, the apparatus further comprising a communication module configured to communicate with the external device and to send at least part of the generated haptic signal to the external device to drive the at least one haptics actuator.

7. The apparatus according to claim 1, further comprising a wireless receiver to receive a signal transmitted wirelessly by the media device.

8. The apparatus according to claim 1, wherein the media content is video game content and the media device is a computer entertainment device.

9. The apparatus according to claim 1, wherein the apparatus is a smartphone, and each of the detection module, receiving module and haptics generation module is operable by an application software installed on the smartphone.

10. The apparatus of claim 1, wherein the transfer interface provides a physical connection between the apparatus and the one or more peripherals.

11. The apparatus of claim 1, wherein the one or more peripherals lack haptic functionality.

12. The apparatus of claim 1, wherein the quantity of haptics actuators controllable by the apparatus comprise at least one haptics actuator that is integrated with the apparatus and at least one haptics actuator that is not integrated with the apparatus.

13. The apparatus of claim 1, wherein the media data comprises visual data and is not encoded with an original haptic signal, and the haptics generation module is configured to generate the haptic signal based on the visual data.

14. The apparatus of claim 1, wherein the detection module is further configured to determine position information indicating a spatial position of the apparatus, and the haptics generation module is configured to generate the haptic signal based at least in part on the position information.

15. A method of providing haptic feedback to accompany media content delivered by a media device, the method comprising:

receiving, from the media device, media data at a second device;

determining, at the second device, a quantity of haptics actuators controllable by the second device and a haptic capability of each haptics actuator controllable by the second device;

generating, at the second device, a haptic signal based on (i) the determined quantity of haptics actuators, (ii) the determined haptic capability of each haptics actuator, and (iii) the received media data, wherein the haptic signal has multiple channels, each channel of the multiple channels being configured to drive a different haptics actuator; and transferring, by contact, haptic feedback generated by haptics actuators driven with the haptic signal to one or more peripherals connected to the media device.

16. The method of claim 15, wherein the quantity of haptics actuators controllable by the second device comprise at least one haptics actuator that is integrated with the second device and at least one haptics actuator that is not integrated with the second device.

17. The method of claim 15, wherein the media data comprises an original haptic signal associated with the media content, and generating the haptic signal comprises modifying the original haptic signal according to the determined quantity of haptics actuators and the determined haptic capability of each haptics actuator.

18. The method of claim 15, wherein the media data comprises one or more audio signals and is not encoded with an original haptic signal, the method comprising generating the haptic signal based on at least one of the one or more audio signals.

19. The method of claim 15, wherein the media data comprises visual data and is not encoded with an original haptic signal, the method comprising generating the haptic signal based on the visual data.

* * * * *